US012623191B2

(12) United States Patent
Zhou et al.

(10) Patent No.: US 12,623,191 B2
(45) Date of Patent: May 12, 2026

(54) ROTARY FILTERING TYPE TWO-IN-ONE STIRRING KETTLE

(71) Applicant: INNOVATION RESEARCH INSTITUTE OF ZHEJIANG UNIVERSITY OF TECHNOLOGY, SHENGZHOU, Zhejiang (CN)

(72) Inventors: Shuiqing Zhou, Zhejiang (CN); Ding Xia, Zhejiang (CN); Zengliang Gao, Zhejiang (CN); Qizhi Yang, Zhejiang (CN); Mingjue Zhou, Zhejiang (CN)

(73) Assignee: INNOVATION RESEARCH INSTITUTE OF ZHEJIANG UNIVERSITY OF TECHNOLOGY, SHENGZHOU, Zhejiang (CN)

(*) Notice: Subject to any disclaimer, the term of this patent is extended or adjusted under 35 U.S.C. 154(b) by 455 days.

(21) Appl. No.: 18/357,970

(22) Filed: Jul. 24, 2023

(65) Prior Publication Data

US 2024/0058775 A1 Feb. 22, 2024

Related U.S. Application Data

(63) Continuation of application No. PCT/CN2023/101668, filed on Jun. 21, 2023.

(30) Foreign Application Priority Data

Aug. 19, 2022 (CN) ........................ 202210996033.0

(51) Int. Cl.
*B01F 27/112* (2022.01)
*B01F 27/21* (2022.01)
(Continued)

(52) U.S. Cl.
CPC ............ *B01F 27/112* (2022.01); *B01F 27/21* (2022.01); *B01F 35/32* (2022.01); *B01F 2035/351* (2022.01)

(58) Field of Classification Search
CPC B01F 27/11; B01F 27/21; B01F 35/32; B01F 35/145; B01F 35/1872; B01F 23/808; B01F 2035/351
See application file for complete search history.

(56) References Cited

U.S. PATENT DOCUMENTS 4,178,246 A * 12/1979 Klein .................. B01D 35/143 210/411
6,391,199 B1 * 5/2002 Diemer ................. B01D 33/17 210/345

(Continued)

FOREIGN PATENT DOCUMENTS

CN 201144247 Y * 11/2008
CN 209791523 U * 12/2019
CN 214913764 U * 11/2021

*Primary Examiner* — Marc C Howell
(74) *Attorney, Agent, or Firm* — JCIPRNET

(57) ABSTRACT

Disclosed in the present invention is a rotary filtering type two-in-one stirring kettle. The stirring kettle includes a kettle body, where an upper sealing head and a lower sealing head are arranged at a top and a bottom of the kettle body respectively, a stirrer is arranged in the kettle body, and a rotary filtering mechanism is arranged between the kettle body and the lower sealing head. A back-flushing cleaning mechanism for dredging the rotary filtering mechanism is arranged at a bottom of the lower sealing head, and the rotary filtering mechanism is fixedly connected to the kettle body and the lower sealing head.

9 Claims, 4 Drawing Sheets

(51) Int. Cl.
*B01F 35/32* (2022.01)
*B01F 35/30* (2022.01)

(56) References Cited

U.S. PATENT DOCUMENTS

| | | | | |
|---|---|---|---|---|
| 6,615,710 | B1 * | 9/2003 | Ishigaki | B01D 29/60<br>100/48 |
| 2015/0096945 | A1 * | 4/2015 | Chen | B01D 33/21<br>210/330 |
| 2019/0194035 | A1 * | 6/2019 | Mackay Pett | C02F 1/283 |
| 2021/0069617 | A1 * | 3/2021 | Saito | B01D 24/12 |
| 2024/0075440 | A1 * | 3/2024 | Chesterman | B01D 29/80 |

* cited by examiner

ROTARY FILTERING TYPE TWO-IN-ONE STIRRING KETTLE

CROSS-REFERENCE TO RELATED APPLICATION

This application is a continuation of international PCT application serial no. PCT/CN2023/101668, filed on Jun. 21, 2023, which claims the priority benefit of China application no. 202210996033.0, filed on Aug. 19, 2022. The entirety of each of the above-mentioned patent applications is hereby incorporated by reference herein and made a part of this specification.

BACKGROUND

Technical Field

The present invention relates to the field of enzyme reactors, and in particular to a rotary filtering type two-in-one stirring kettle.

Description of Related Art

An immobilized enzyme refers to the enzyme immobilized on a carrier by using an artificial method, which is in a locked state in a certain space, and can continuously react, and the reacted enzyme can be recycled. At present, theoretical and application studies of the immobilized enzyme have achieved a number of important results, and are widely used in the fields of food, medicine, chemical engineering, etc.

In a traditional process, after a reaction in an enzyme catalytic reactor is completed, a reaction product and enzyme carrier particles are conveyed to a filter for filtration and separation, and then conveyed back to the reactor to continue a next batch of reactions. A traditional filter is single in filtering manner, a screen plate is prone to blockage, filtering time is long, and a separation effect is poor. Moreover, a transport line between the reactor and the filter is long, resulting in long batch reaction period, low production efficiency, and fast enzyme carrier loss.

SUMMARY

In view of the problems existing in the prior art, an objective of the present invention is to provide a rotary filtering type two-in-one stirring kettle. The stirring kettle integrates an enzyme reactor and a filter into a whole, such that filtering time is short, filtering efficiency is high, a reaction period is shortened, and production efficiency is improved.

The technical solutions of the present invention are as follows.

A rotary filtering type two-in-one stirring kettle includes a kettle body, where an upper sealing head and a lower sealing head are arranged at a top and a bottom of the kettle body respectively, a stirrer is arranged in the kettle body, and a rotary filtering mechanism is arranged between the kettle body and the lower sealing head. A back-flushing cleaning mechanism for dredging the rotary filtering mechanism is arranged at a bottom of the lower sealing head, and the rotary filtering mechanism is fixedly connected to the kettle body and the lower sealing head.

Furthermore, the rotary filtering mechanism includes an upper sealing cover, a rotary filtering plate and a lower sealing cover, where the lower sealing cover is of an annular structure, a group of electromagnetic blocks are uniformly arranged at the positions, close to an outer edge, of an upper surface of the lower sealing cover in a circumferential direction of the lower sealing cover, and first grooves are formed between adjacent electromagnetic blocks. The rotary filtering plate is arranged at a center of the lower sealing cover, the upper sealing cover is arranged on the lower sealing cover and the rotary filtering plate, the rotary filtering plate is rotationally connected in the rotary filtering mechanism, and a lower surface of the lower sealing cover is connected to the lower sealing head in a welding manner.

Furthermore, the rotary filtering plate is of a circular plate structure made of a light material, several filtering holes are uniformly provided in the surface of the rotary filtering plate, and a first permanent magnet and a second permanent magnet are symmetrically arranged at an edge of the rotary filtering plate. A group of sliding blocks are arranged at the edge of the rotary filtering plate, the sliding blocks are uniformly distributed with the two permanent magnets as a symmetrical axis, and a first annular sliding rail is arranged at the position, close to an inner edge, of the upper surface of the lower sealing cover.

Furthermore, a size of the rotary filtering plate matches a size of a center of the lower sealing cover, directions of outward magnetic poles of the first permanent magnet and the second permanent magnet are opposite, and sliding portions of the sliding blocks are of vertically symmetrical hemispherical sliding blocks.

Furthermore, the upper sealing cover is of an annular structure, a size of a center of the upper sealing cover matches a size of the rotary filtering plate, a group of fixing blocks are uniformly arranged in the positions, close to an outer edge, of a lower surface of the upper sealing cover in a circumferential direction of the upper sealing cover, and a second groove is formed between two adjacent fixing block. A second annular sliding rail is arranged at the position, close to an inner edge, of the lower surface of the upper sealing cover, and an upper surface of the upper sealing cover is connected to the kettle body in a welding manner.

Furthermore, sizes of the fixing blocks match sizes of the first grooves, and sizes of the electromagnetic blocks match sizes of the second grooves. The upper sealing cover and the lower sealing cover are clamped in the first grooves by means of the fixing blocks, the electromagnetic blocks are clamped in the second grooves to achieve tight attachment, and then limiting and static sealing of the rotary filtering mechanism are achieved by sleeving a sealing ring. The sliding blocks are arranged on the first annular sliding rail, such that the sliding blocks slide between the first annular sliding rail and the second annular sliding rail.

Furthermore, Hall sensors are arranged in the circumferential directions of the rotary filtering plate and the upper sealing cover respectively, and the two Hall sensors are symmetrically arranged.

Furthermore, the back-flushing cleaning mechanism is of a shunt pipe structure and includes a back-flushing cleaning mechanism body, where the back-flushing cleaning mechanism body is provided with an air inlet and a group of air outlets, and the air outlets are arranged with the air inlet as a symmetrical axis.

Furthermore, the air outlets are provided with valves, directions of the air outlets are inclined upward and point to the rotary filtering plate, the air inlet is internally provided with a back-flushing fan, and the air outlets of the back-flushing cleaning mechanism are connected to the bottom of the lower sealing head by means of flanges.

Furthermore, the stirrer includes a stirring shaft and a stirring paddle arranged at a bottom of the stirring shaft, where the stirring paddle is located on the rotary filtering plate, and the stirring shaft is connected to an output shaft of an electric motor arranged at a center of a top of the upper sealing head by means of a coupler.

Compared with the prior art, the present invention has the beneficial effects as follows.

(1) In the present invention, a reactor and a filter are integrated into a whole, such that an occupied space is reduced, and a manufacturing cost is saved. In only one device, an enzyme catalytic reaction and separation can be performed, such that an immobilized enzyme does not need to be repeatedly transported between the reactor and the filter, a reaction period is shortened, production efficiency is improved, and a loss speed of enzyme carriers is reduced.

(2) In the present invention, the rotary filtering device is arranged, after the reaction is completed, the stirring paddle continues to perform stirring, the rotary filtering plate starts to rotate, and under an action of centrifugal force, the filtering plate is prevented from being blocked, a filtering speed is accelerated, and filtering efficiency is improved.

(3) In the present invention, the back-flushing device is arranged, after filtration is completed, the valves are opened to perform back-flushing cleaning on the rotary filtering plate, such that the filtering plate is further dredged, immobilized enzyme carriers are dispersed, and a subsequent batch of reactions are facilitated.

DESCRIPTION OF THE EMBODIMENTS

The present invention is further described below in conjunction with accompanying drawings, but the scope protected by the present invention is not limited to the mentioned scope.

Figure 1:
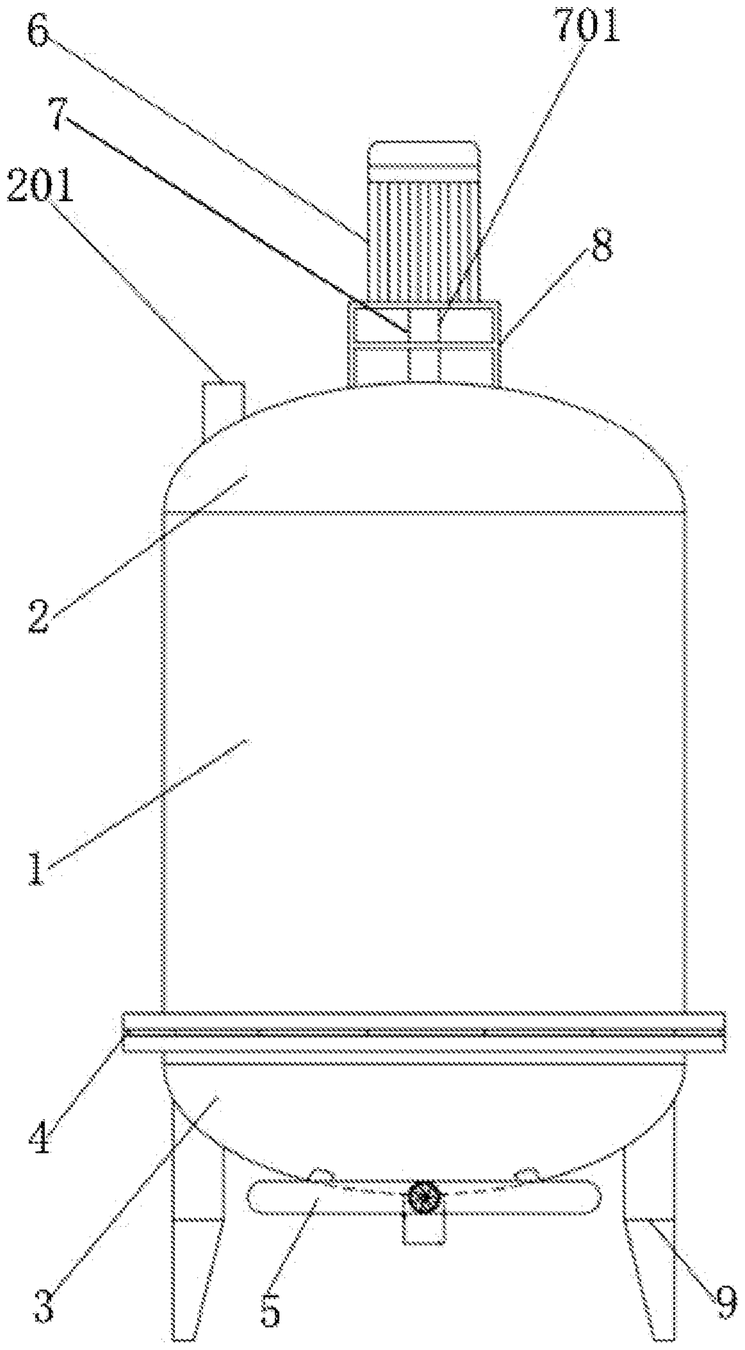
FIG. 1 is a schematic diagram of an integral structure of the present invention.
Figure 2:
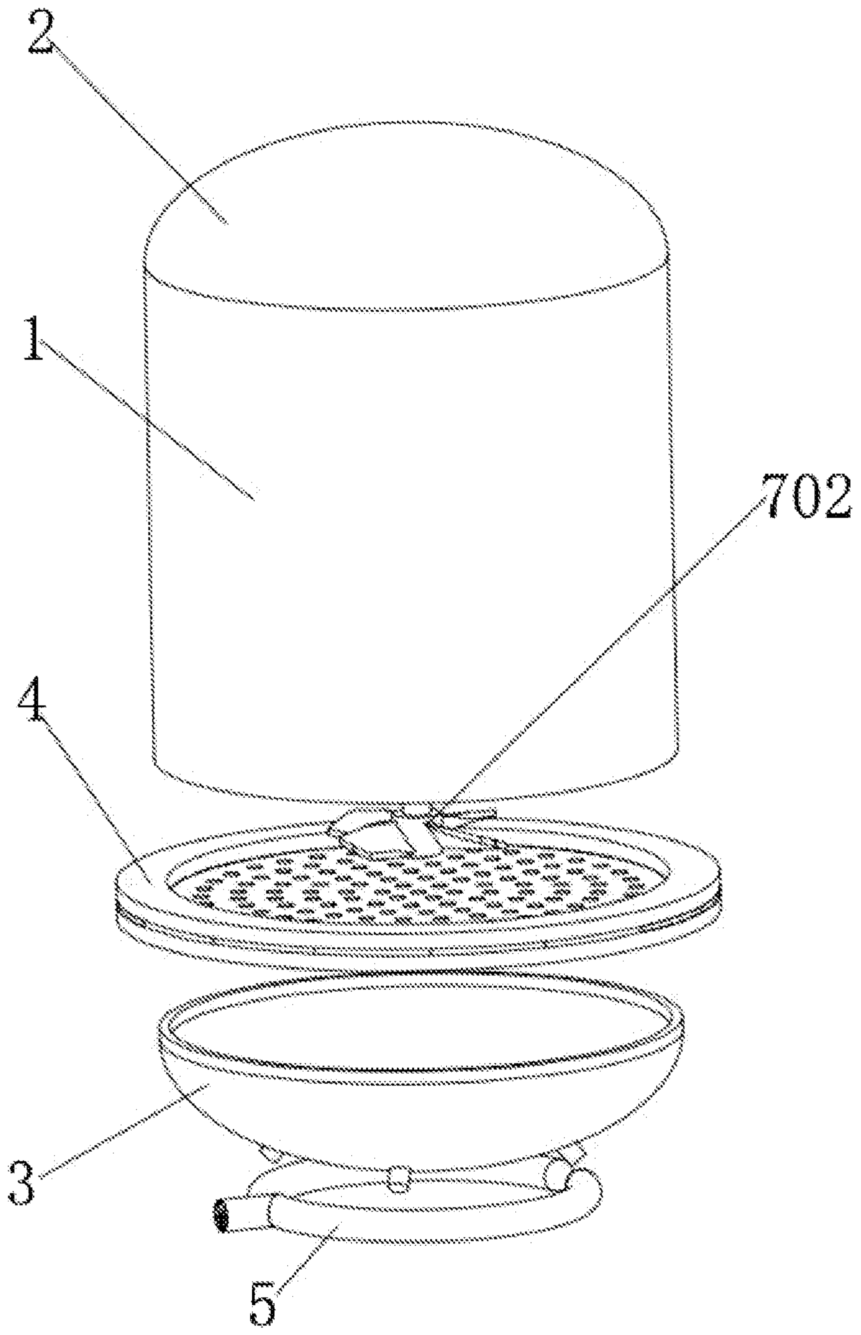
FIG. 2 is an exploded schematic diagram of the present invention.
Figure 3:
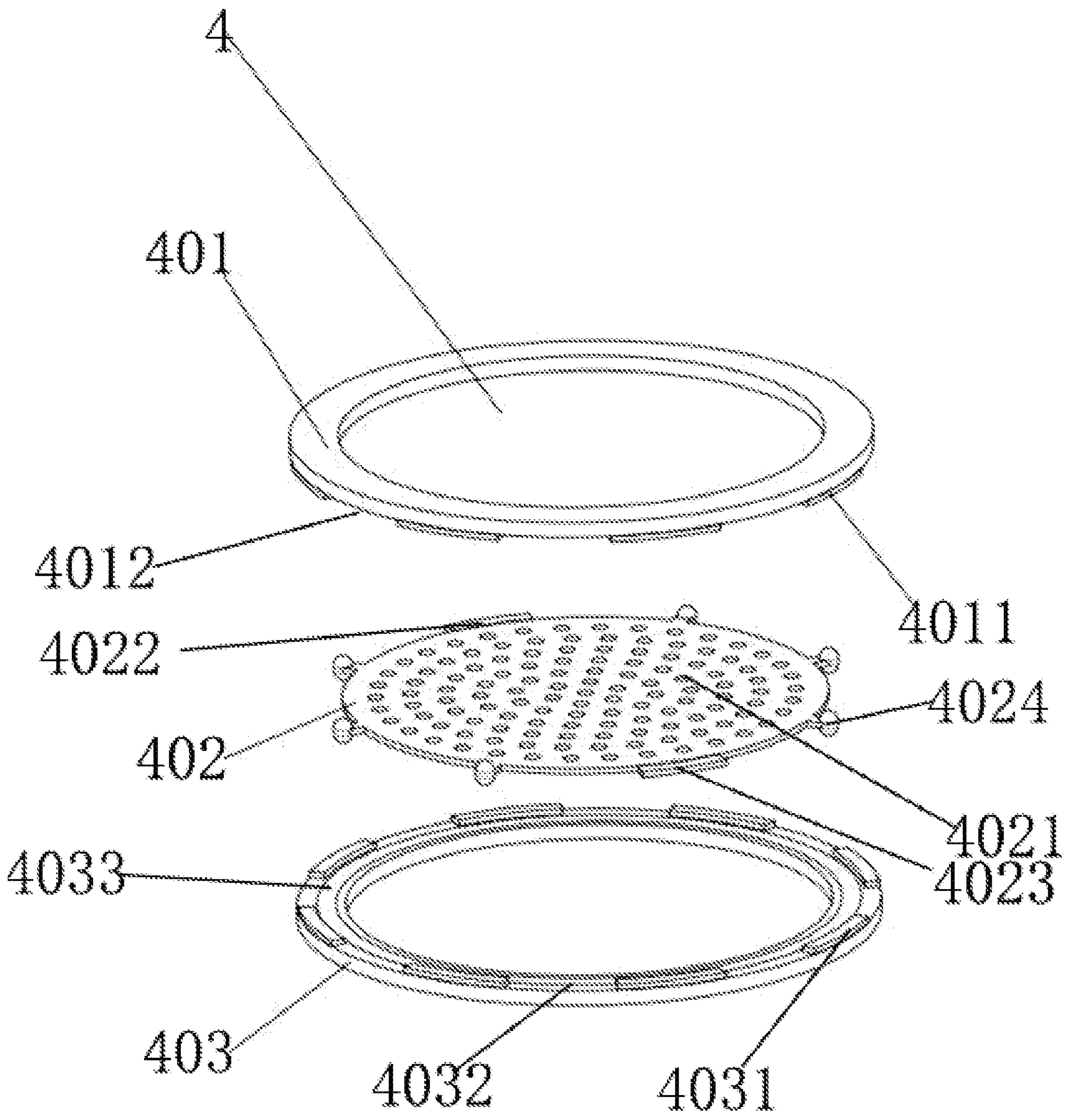
FIG. 3 is an exploded schematic diagram of a rotary filtering mechanism of the present invention.
Figure 4:
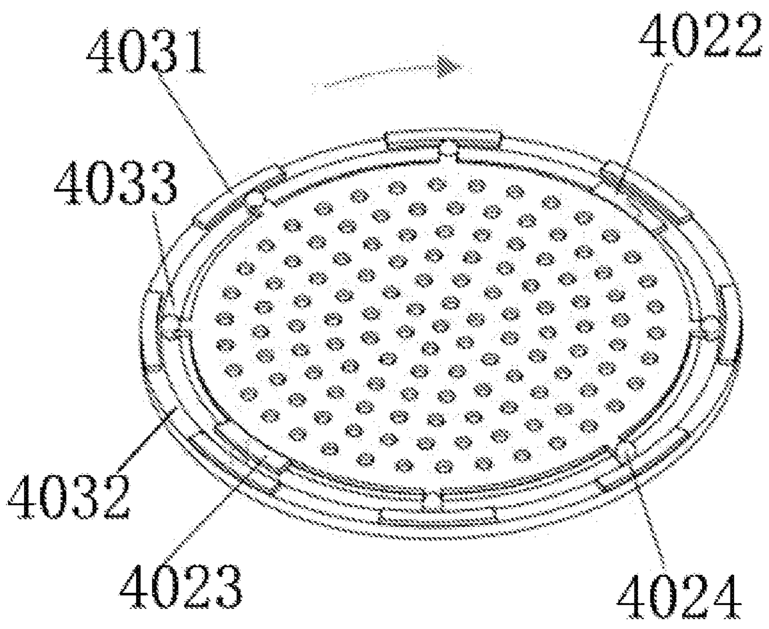
FIG. 4 is a schematic diagram for rotation of a rotary filtering plate of the present invention.
Figure 5:
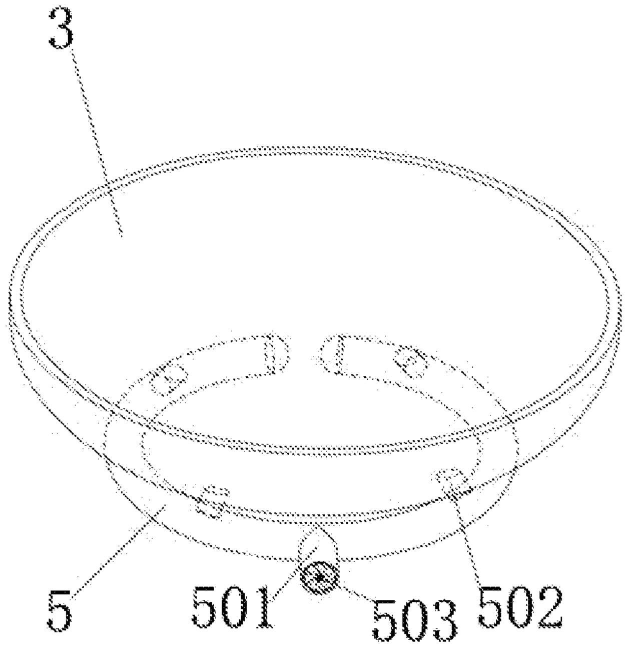
FIG. 5 is a schematic structural diagram of a back-flushing cleaning mechanism of the present invention.

As shown in FIG. 1 to FIG. 5, a rotary filtering type two-in-one stirring kettle includes a kettle body 1, where the kettle body 1 is fixed on the ground by means of supporting columns 9, and an upper sealing head 2 and a lower sealing head 3 are arranged at a top and a bottom of the kettle body 1 respectively. A feeding port 201 is provided in a side portion of the upper sealing head 2, an electric motor support 8 is arranged at a center of a top of the upper sealing head, an electric motor 6 is arranged on the electric motor support 8, and a stirrer 7 is arranged in the kettle body 1.

A rotary filtering mechanism 4 is arranged between the kettle body 1 and the lower sealing head 3, and a back-flushing cleaning mechanism 5 for dredging the rotary filtering mechanism 4 is arranged at a bottom of the lower sealing head 3. According to the present invention, a reactor and a filter are integrated into a space for an enzyme catalytic reaction and separation, and an immobilized enzyme does not need to be repeatedly transported between the reactor and the filter, such that a reaction period is shortened, and production efficiency is improved.

The rotary filtering mechanism 4 includes an upper sealing cover 401, a rotary filtering plate 402 and a lower sealing cover 403, where the upper sealing cover 401 is of an annular structure. A group of fixing blocks 4011 are uniformly arranged in the positions, close to an outer edge, of a lower surface of the upper sealing cover 401 in a circumferential direction of the upper sealing cover, and a second groove 4012 is formed between two adjacent fixing blocks 4011. A second annular sliding rail 4013 is arranged at the position, close to an inner edge, of the lower surface of the upper sealing cover 401, and an upper surface of the upper sealing cover 401 is connected to the kettle body 1 in a welding manner.

The rotary filtering plate 402 is of a circular plate structure made of a light material, such that a rotation process can be conveniently performed. Several filtering holes 4021 are uniformly provided in the surface of the rotary filtering plate 402, and a first permanent magnet 4022 and a second permanent magnet 4023 are symmetrically arranged at an edge of the rotary filtering plate 402. A group of sliding blocks 4024 are arranged at the edge of the rotary filtering plate 402, the sliding blocks 4024 are uniformly distributed with the two permanent magnets as a symmetrical axis, and directions of outward magnetic poles of the first permanent magnet 4022 and the second permanent magnet 4023 are opposite. Sliding portions of the sliding blocks 4024 are of vertically symmetrical hemispherical sliding blocks.

A size of a center of the upper sealing cover 401 matches a size of the rotary filtering plate 402, shapes and sizes of the fixing blocks 4011 match shapes and sizes of the electromagnetic blocks 4031 respectively, and the fixing blocks and the electromagnetic blocks have the same quantity.

The lower sealing cover 403 is of an annular structure, a group of electromagnetic blocks 4031 are uniformly arranged at the positions, close to an outer edge, of an upper surface of the lower sealing cover 403 in a circumferential direction of the lower sealing cover, first grooves 4032 are formed between adjacent electromagnetic blocks 4031, and a first annular sliding rail 4033 is arranged at the position, close to an inner edge, of the upper surface of the lower sealing cover 403. A size of the rotary filtering plate 402 matches a size of a center of the lower sealing cover 403, the rotary filtering plate 402 is arranged at the center of the lower sealing cover 403, and a lower surface of the lower sealing cover 403 is connected to the lower sealing head 3 in a welding manner.

Sizes of the fixing blocks 4011 match sizes of the first grooves 4032, and sizes of the electromagnetic blocks 4031 match sizes of the second grooves 4012. The upper sealing cover 401 and the lower sealing cover 403 are clamped in the first grooves 4032 by means of the fixing blocks 4011, the electromagnetic blocks 4031 are clamped in the second grooves 4012 to achieve tight attachment, and then limiting and static sealing of the rotary filtering mechanism 4 are achieved by sleeving a sealing ring. The sliding blocks 4024 are arranged on the first annular sliding rail 4033, such that the sliding blocks 4024 slide between the first annular sliding rail 4033 and the second annular sliding rail 4013.

Hall sensors are arranged in the circumferential directions of the rotary filtering plate 402 and the upper sealing cover 401 respectively, and the two Hall sensors are symmetrically arranged, such that the rotary filtering plate 402 can control change of a current direction every half turn of rotation to ensure stability of rotation.

The back-flushing cleaning mechanism 5 is of a shunt pipe structure and includes a back-flushing cleaning mechanism body, where the back-flushing cleaning mechanism body is provided with an air inlet 501 and a group of air outlets 502, and the air outlets 502 are arranged with the air inlet 501 as a symmetrical axis. In this example, the number of the air inlet 501 is one, and the number of the air outlets 502 is four. The air outlets 502 are configured to perform back flushing on the rotary filtering plate 402 after filtration is completed, thereby dispersing the rotary filtering plate 402, dispersing immobilized enzyme carriers, and facilitating a subsequent batch of reactions.

The air outlets 502 are provided with valves, and directions of the air outlets 502 are inclined upward and point to the rotary filtering plate 402. The air inlet 501 is internally provided with a back-flushing fan 503, and the air outlets 502 are connected to the bottom of the lower sealing head 3 by means of flanges, such that fixing and sealing of the back-flushing cleaning mechanism 5 are achieved.

The stirrer 7 includes a stirring shaft 701 and a stirring paddle 702 arranged at a bottom of the stirring shaft 701, where the stirring paddle 702 is located on the rotary filtering plate 402, and the stirring shaft 701 is connected to an output shaft of an electric motor 6 arranged at a center of a top of the upper sealing head 2 by means of a coupler.

Specifically, in the implementation, the two electromagnetic blocks symmetrically distributed in the rotary filtering mechanism 4 are regarded as a pair, and each pair of electromagnetic blocks are energized in turn according to a rotation direction of the stirring shaft 701 to generate an adsorption effect on the first permanent magnet 4022 and the second permanent magnet 4023 which are also symmetrically distributed, and then the rotary filtering plate 402 is driven to rotate by means of sliding of the sliding blocks 4024 in the first annular sliding rail 4033. The Hall sensors are arranged in the rotary filtering mechanism 4 to ensure stability of rotation of the rotary filtering plate 402. Compared with the prior art, the mechanism has higher filtering efficiency, makes full use of a separation effect of centrifugal force, and ensures that the enzyme carriers are less likely to block the filtering holes. Moreover, the combination of the rotation of the rotary filtering plate 402 and stirring of the stirring paddle 702 increases a filtering speed.

What is claimed is:

1. A rotary filtering type two-in-one stirring kettle, comprising a kettle body, wherein an upper sealing head and a lower sealing head are arranged at a top and a bottom of the kettle body respectively, a stirrer is arranged in the kettle body, a rotary filtering mechanism is arranged between the kettle body and the lower sealing head, a back-flushing cleaning mechanism for dredging the rotary filtering mechanism is arranged at a bottom of the lower sealing head, and the rotary filtering mechanism is fixedly connected to the kettle body and the lower sealing head, wherein the rotary filtering mechanism comprises an upper sealing cover, a rotary filtering plate and a lower sealing cover, the lower sealing cover is an annular structure, a group of electromagnetic blocks are uniformly and circumferentially arranged adjacent to an outer edge of an upper surface of the lower sealing cover, first grooves are formed between two adjacent electromagnetic blocks, the rotary filtering plate is arranged at a center of the lower sealing cover, the upper sealing cover is arranged on the lower sealing cover and the rotary filtering plate, the rotary filtering plate is rotationally connected in the rotary filtering mechanism, and a lower surface of the lower sealing cover is connected to the lower sealing head in a welding manner.

2. The rotary filtering type two-in-one stirring kettle according to claim 1, wherein the rotary filtering plate is a circular plate structure, several filtering holes are uniformly provided in the surface of the rotary filtering plate, a first permanent magnet and a second permanent magnet are symmetrically arranged at an edge of the rotary filtering plate, a group of sliding blocks are arranged at the edge of the rotary filtering plate, the sliding blocks are uniformly distributed with the first permanent magnet and the second permanent magnet as a symmetrical axis, and a first annular sliding rail is arranged adjacent to an inner edge of the upper surface of the lower sealing cover.

3. The rotary filtering type two-in-one stirring kettle according to claim 2, wherein a size of the rotary filtering plate matches a size of a center of the lower sealing cover, a direction of an outward magnetic pole of the first permanent magnet and a direction of an outward magnetic pole of the second permanent magnet are opposite, and sliding portions of the sliding blocks are vertically symmetrical hemispherical sliding blocks.

4. The rotary filtering type two-in-one stirring kettle according to claim 3, wherein the upper sealing cover is an annular structure, a size of a center of the upper sealing cover matches a size of the rotary filtering plate, a group of fixing blocks are uniformly and circumferentially arranged adjacent to an outer edge of a lower surface of the upper sealing cover, the upper sealing cover comprises second grooves, each of the second grooves is formed between two adjacent fixing blocks, a second annular sliding rail is arranged adjacent to an inner edge of the lower surface of the upper sealing cover, and an upper surface of the upper sealing cover is connected to the kettle body in a welding manner.

5. The rotary filtering type two-in-one stirring kettle according to claim 4, wherein a size of each of the fixing blocks match a size of each of the first grooves, a size of each of the electromagnetic blocks match a size of each of the second grooves, the upper sealing cover and the lower sealing cover are clamped in the first grooves by means of the fixing blocks, the electromagnetic blocks are clamped in the second grooves to achieve tight attachment, and then limiting and static sealing of the rotary filtering mechanism are achieved by sleeving a sealing ring; and the sliding blocks are arranged on the first annular sliding rail, such that the sliding blocks slide between the first annular sliding rail and the second annular sliding rail.

6. The rotary filtering type two-in-one stirring kettle according to claim 5, wherein two Hall sensors are circumferentially arranged in the rotary filtering plate and the upper sealing cover, and the two Hall sensors are symmetrically arranged.

7. The rotary filtering type two-in-one stirring kettle according to claim 6, wherein the back-flushing cleaning mechanism is a shunt pipe structure and comprises a back-flushing cleaning mechanism body, the back-flushing cleaning mechanism body is provided with an air inlet and a group of air outlets, and the air outlets are arranged with the air inlet as a symmetrical axis.

8. The rotary filtering type two-in-one stirring kettle according to claim 7, wherein the air outlets are provided with valves, the air outlets are inclined upward and point to the rotary filtering plate, the air inlet is internally provided with a back-flushing fan, and the air outlets of the back-flushing cleaning mechanism are connected to the bottom of the lower sealing head by means of flanges.

9. The rotary filtering type two-in-one stirring kettle according to claim 1, wherein the stirrer comprises a stirring shaft and a stirring paddle arranged at a bottom of the stirring shaft, the stirring paddle is located on the rotary filtering plate, and the stirring shaft is connected to an output shaft of an electric motor arranged at a center of a top of the upper sealing head by means of a coupler.

* * * * *